(12) United States Patent
Lee et al.

(10) Patent No.: US 8,896,572 B2
(45) Date of Patent: Nov. 25, 2014

(54) DISPLAY DEVICE AND METHOD OF DRIVING THE SAME FOR ALTERNATELY APPLYING A RESET VOLTAGE TO ROW AND COLUMN SENSOR DATA LINES

(71) Applicants: Joo-Hyung Lee, Gwacheon-si (KR); Kee-Han Uh, Yongin-si (KR); Man-Seung Cho, Seoul (KR)

(72) Inventors: Joo-Hyung Lee, Gwacheon-si (KR); Kee-Han Uh, Yongin-si (KR); Man-Seung Cho, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/925,153

(22) Filed: Jun. 24, 2013

(65) Prior Publication Data

US 2013/0278559 A1    Oct. 24, 2013

Related U.S. Application Data

(63) Continuation of application No. 12/174,095, filed on Jul. 16, 2008, now Pat. No. 8,471,827.

(30) Foreign Application Priority Data

Dec. 26, 2007   (KR) .................. 10-2007-0137770

(51) Int. Cl.
  *G06F 3/041*  (2006.01)
  *G06F 3/045*  (2006.01)
  *G06F 3/044*  (2006.01)

(52) U.S. Cl.
  CPC .............. *G06F 3/044* (2013.01); *G06F 3/0416* (2013.01)
  USPC .......................................... 345/174; 345/173

(58) Field of Classification Search
  CPC ...... G06F 3/041; G06F 3/0412; G06F 3/0416; G06F 3/044; H03K 17/955; H03K 17/962
  USPC ............ 345/173–178; 341/5, 20, 33; 323/904
  See application file for complete search history.

(56) References Cited

U.S. PATENT DOCUMENTS

| | | |
|---|---|---|
| 4,237,421 A | 12/1980 | Waldron |
| 4,651,133 A | 3/1987 | Ganesan et al. |

(Continued)

FOREIGN PATENT DOCUMENTS

| | | |
|---|---|---|
| CN | 2663918 | 12/2004 |
| CN | 1726453 | 1/2006 |

(Continued)

OTHER PUBLICATIONS

Extended European Search Report issued on Jun. 22, 2012 in EP Application No. 08021485.1.

(Continued)

*Primary Examiner* — Joe H Cheng
*Assistant Examiner* — Keith Crawley
(74) *Attorney, Agent, or Firm* — H.C. Park & Associates, PLC

(57) ABSTRACT

In a touch sensible display device, a first sensing unit is connected to a row sensor data line and outputs a first sensing signal according to a touch, and a second sensing unit is connected to a column sensor data line and outputs a second sensing signal according to the touch. A sensing signal processor alternately applies a reset voltage to the row sensor data line and the column sensor data line and generates a sensing data signal according to the first sensing signal and the second sensing signal, and a touch determiner processes a sensing data signal to generate touch information.

6 Claims, 18 Drawing Sheets

(56) References Cited

U.S. PATENT DOCUMENTS

| | | | |
|---|---|---|---|
| 5,225,959 A * | 7/1993 | Stearns | 361/283.1 |
| 5,432,671 A | 7/1995 | Allavena | |
| 5,777,604 A * | 7/1998 | Okajima et al. | 345/173 |
| 5,841,078 A | 11/1998 | Miller et al. | |
| 6,108,438 A | 8/2000 | Bird et al. | |
| 6,114,862 A | 9/2000 | Tartagni et al. | |
| 6,256,022 B1 | 7/2001 | Manaresi et al. | |
| 6,970,160 B2 | 11/2005 | Mulligan et al. | |
| 7,154,393 B2 | 12/2006 | Okushima et al. | |
| 7,545,153 B2 | 6/2009 | Abe | |
| 7,612,818 B2 | 11/2009 | Nakamura et al. | |
| 2004/0004488 A1 | 1/2004 | Baxter | |
| 2004/0119701 A1 | 6/2004 | Mulligan et al. | |
| 2005/0001633 A1 | 1/2005 | Okushima et al. | |
| 2005/0016273 A1 | 1/2005 | Murata et al. | |
| 2005/0073324 A1 | 4/2005 | Umeda et al. | |
| 2005/0099188 A1 | 5/2005 | Baxter | |
| 2005/0157575 A1 | 7/2005 | Binnig et al. | |
| 2005/0212916 A1 | 9/2005 | Nakamura et al. | |
| 2006/0017701 A1 | 1/2006 | Marten et al. | |
| 2006/0290677 A1 | 12/2006 | Lyon et al. | |
| 2007/0176868 A1 * | 8/2007 | Lee et al. | 345/87 |
| 2007/0200832 A1 | 8/2007 | Cho et al. | |
| 2007/0279385 A1 | 12/2007 | Woolley et al. | |
| 2007/0291009 A1 | 12/2007 | Wright et al. | |
| 2008/0024455 A1 | 1/2008 | Lee et al. | |
| 2008/0048997 A1 | 2/2008 | Gillespie et al. | |
| 2008/0122802 A1 | 5/2008 | Furuhashi et al. | |
| 2008/0245582 A1 | 10/2008 | Bytheway | |

FOREIGN PATENT DOCUMENTS

| | | |
|---|---|---|
| CN | 1963736 | 5/2007 |
| EP | 1 814 018 | 8/2007 |
| JP | 2002-082765 | 3/2002 |
| JP | 2007-199724 | 8/2007 |
| KR | 10-2007-0078522 | 8/2007 |
| WO | 2006-028131 | 3/2006 |
| WO | 2007146780 | 12/2007 |

OTHER PUBLICATIONS

Non-Final Office Action issued on Aug. 12, 2011 in U.S. Appl. No. 12/174,095.
Final Office Action issued on Dec. 15, 2011 in U.S. Appl. No. 12/174,095.
Advisory Action issued on Feb. 23, 2012 in U.S. Appl. No. 12/174,095.
Non-Final Office Action issued on Jun. 4, 2012 in U.S. Appl. No. 12/174,095.
Final Office Action issued on Dec. 21, 2012 in U.S. Appl. No. 12/174,095.
Notice of Allowance and Fee(s) Due issued on Feb. 27, 2013 in U.S. Appl. No. 12/174,095.
Supplemental Notice of Allowability issued on Apr. 9, 2013 in U.S. Appl. No. 12/174,095.

* cited by examiner

DISPLAY DEVICE AND METHOD OF DRIVING THE SAME FOR ALTERNATELY APPLYING A RESET VOLTAGE TO ROW AND COLUMN SENSOR DATA LINES

CROSS-REFERENCE TO RELATED APPLICATIONS

This application is a continuation of U.S. patent application Ser. No. 12/174,095, filed on Jul. 16, 2008, and claims priority from and the benefit of Korean Patent Application No. 10-2007-0137770, filed on Dec. 26, 2007, which is hereby incorporated by reference for all purposes as if fully set forth herein.

BACKGROUND OF THE INVENTION

1. Field of the Invention

The present invention relates to a display device and a method of driving the same. More particularly, the present invention relates to a display device having a touch screen panel and a method of driving the same.

2. Discussion of the Background

In general, a plurality of pixels are arranged in a matrix form in a display device, and the display device displays an image by controlling the light strength of each pixel according to given luminance information.

A touch screen panel is a device that allows a machine, such as a computer, to perform a desired command when a finger or a touch pen (or a stylus) writes a character, draws a picture, or touches an icon on a screen. A display device to which a touch screen panel is attached determines when a user's finger or a touch pen, etc. touches the screen and determines the touch position information thereof.

A plurality of sensing units may be arranged in an approximate matrix form on the touch screen panel, and each sensing unit allows the display device to determine when a user's finger, etc. touches the screen and the touch position by detecting the change in capacitance that is generated as the user's finger, etc. touches the touch screen panel.

The sensing unit may include a variable capacitor having a capacitance that changes according to a touch and a reference capacitor that is connected in parallel to the variable capacitor. As the capacitance of the variable capacitor changes according to a touch, a junction point voltage between the reference capacitor and the variable capacitor changes according to the magnitude of the capacitance change, so that the display device may determine when there is a touch by sensing a voltage.

However, in order to form the reference capacitor, which is connected to the variable capacitor, even if the reference capacitor and the variable capacitor share one electrode, another electrode is further required. This additional electrode may complicate a process of forming the touch screen panel and may increase the thickness of the touch screen panel.

SUMMARY OF THE INVENTION

The present invention provides a display device in which an electrode of the reference capacitor is shared with an electrode of the variable capacitor and no additional electrode is required, and a method of driving the same.

Additional features of the invention will be set forth in the description which follows, and in part will be apparent from the description, or may be learned by practice of the invention.

The present invention discloses a display device including at least one row sensor data line extending in a row direction, at least one column sensor data line extending in a column direction, a first sensing unit, a second sensing unit, a sensing signal processor, and a touch determiner. The first sensing unit is connected to the row sensor data line and outputs a first sensing signal according to a touch, and the second sensing unit is connected to the column sensor data line and outputs a second sensing signal according to the touch. The sensing signal processor alternately applies a reset voltage to the row sensor data line and the column sensor data line and generates a sensing data signal according to the first sensing signal and the second sensing signal. The touch determiner processes the sensing data signal to generate touch information.

The present invention also discloses a display device including an insulator having a first surface that can be touched by a user and a second surface at an opposite side thereof, a plurality of first sensing signal lines disposed on the second surface of the insulator and extending in a first direction, a plurality of second sensing signal lines disposed on the second surface of the insulator and extending in a second direction, a sensing signal processor to alternately apply a reset voltage to the first sensing signal lines and the second sensing signal lines and to generate a sensing data signal according to a first sensing signal flowing to the first sensing signal lines and a second sensing signal flowing to the second sensing signal lines, and a touch determiner to process the sensing data signal to generate touch information. Each first sensing signal line includes a plurality of first sensor electrodes, and a plurality of first connectors that connect the first sensor electrodes and that have a smaller width than the first sensor electrodes. Each second sensing signal line includes a plurality of second sensor electrodes that are adjacent to the first sensor electrodes, and a plurality of second connectors that connect the second sensor electrodes, cross the first connectors, and have a smaller width than the second sensor electrodes. The sensing signal processor receives the second sensing signal while the reset voltage is applied to the first sensing signal lines and the second sensing signal lines are floated, and receives the first sensing signal while the reset voltage is applied to the second sensing signal lines and the first sensing signal lines are floated.

The present invention also discloses a method of driving a display device including at least one row sensor data line extending in a row direction and at least one column sensor data line extending in a column direction. The method includes applying a reset voltage to the column sensor data line during a first period, generating a first output voltage by processing a first sensing signal that is output through the row sensor data line according to a touch during the first period, applying a reset voltage to the row sensor data line during a second period, generating a second output voltage by processing a second sensing signal that is output through the column sensor data line according to the touch during the second period, generating a sensing data signal by processing the first output voltage and the second output voltage, and generating touch information from the sensing data signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
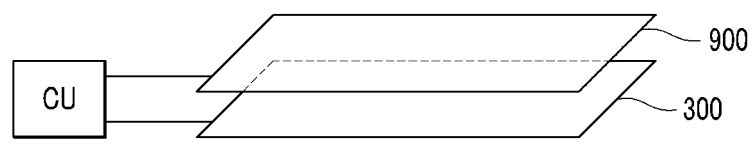
FIG. 1 is a schematic diagram of a display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

First, a display device according to an exemplary embodiment of the present invention is described in detail with reference to FIG. 1, FIG. 2, FIG. 3, FIG. 4, FIG. 5, and FIG. 6.

Figure 2:
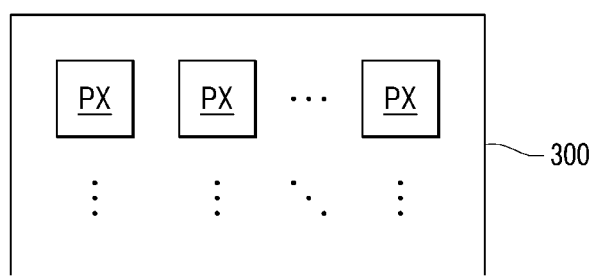
FIG. 2 is a schematic diagram showing a display panel in a display device according to an exemplary embodiment of the present invention.
Figure 3:
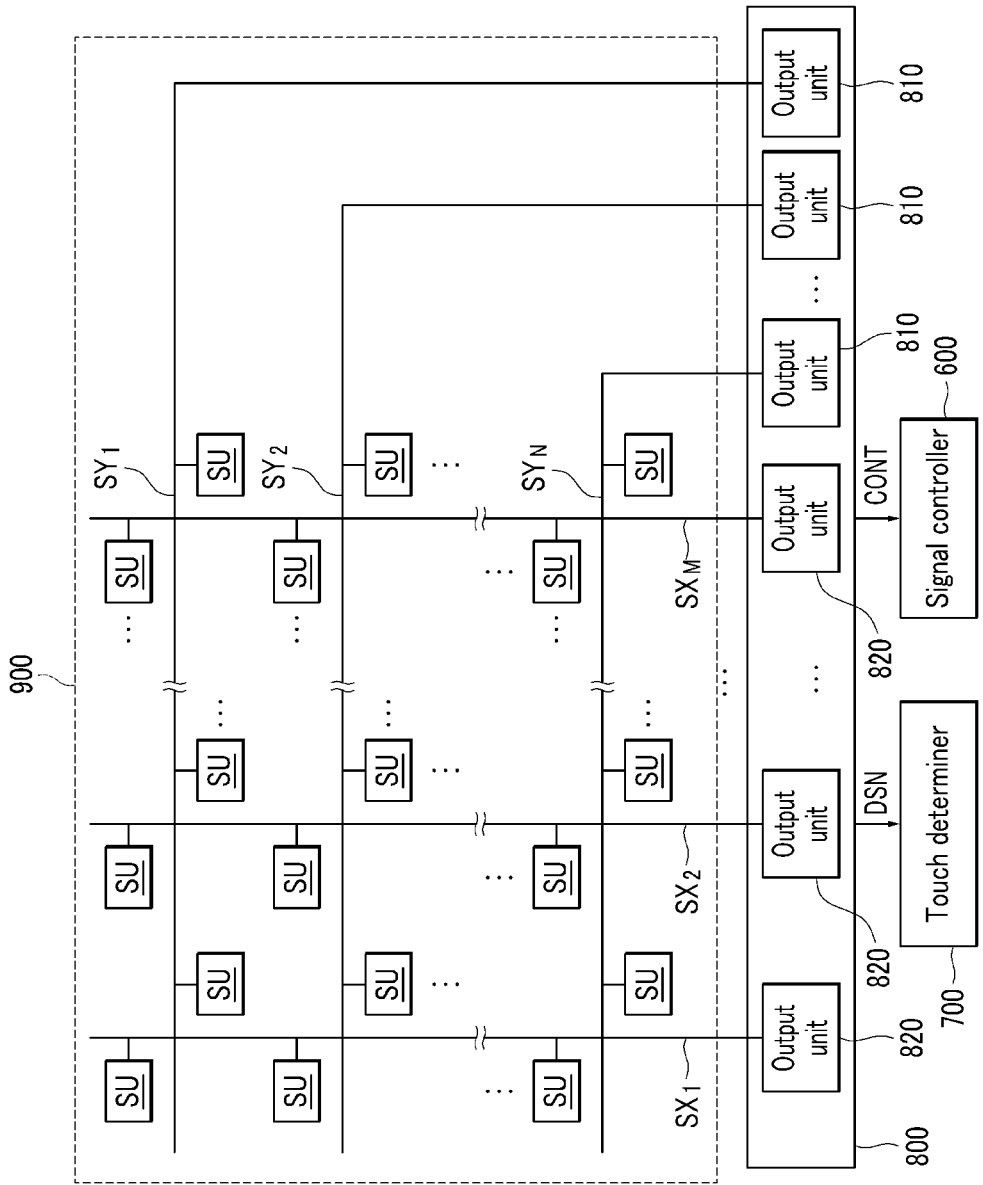
FIG. 3 is a block diagram of a part of a display device according to an exemplary embodiment of the present invention.
Figure 4:
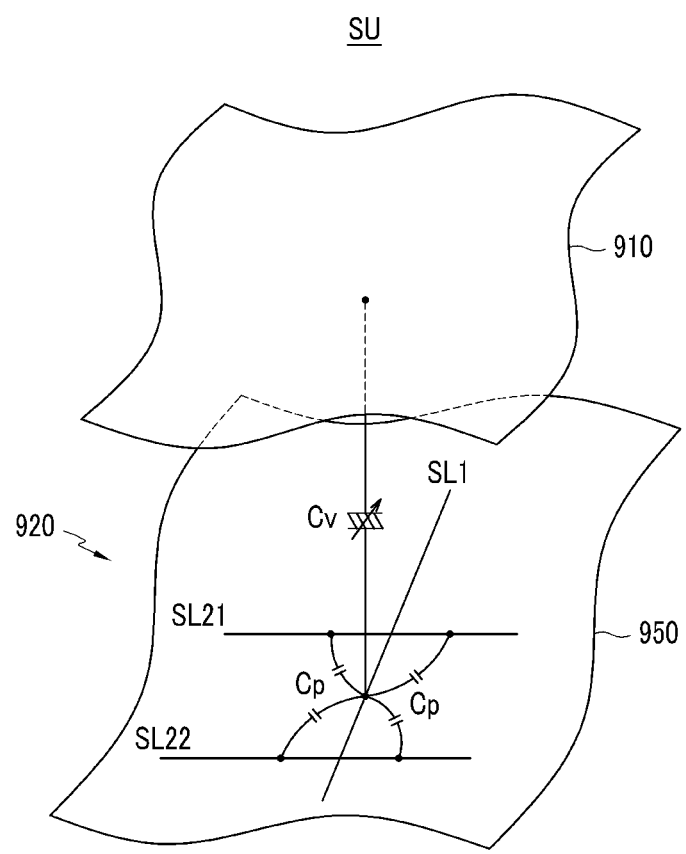
FIG. 4 is an equivalent circuit diagram of a sensing unit in a display device according to an exemplary embodiment of the present invention.
Figure 5:
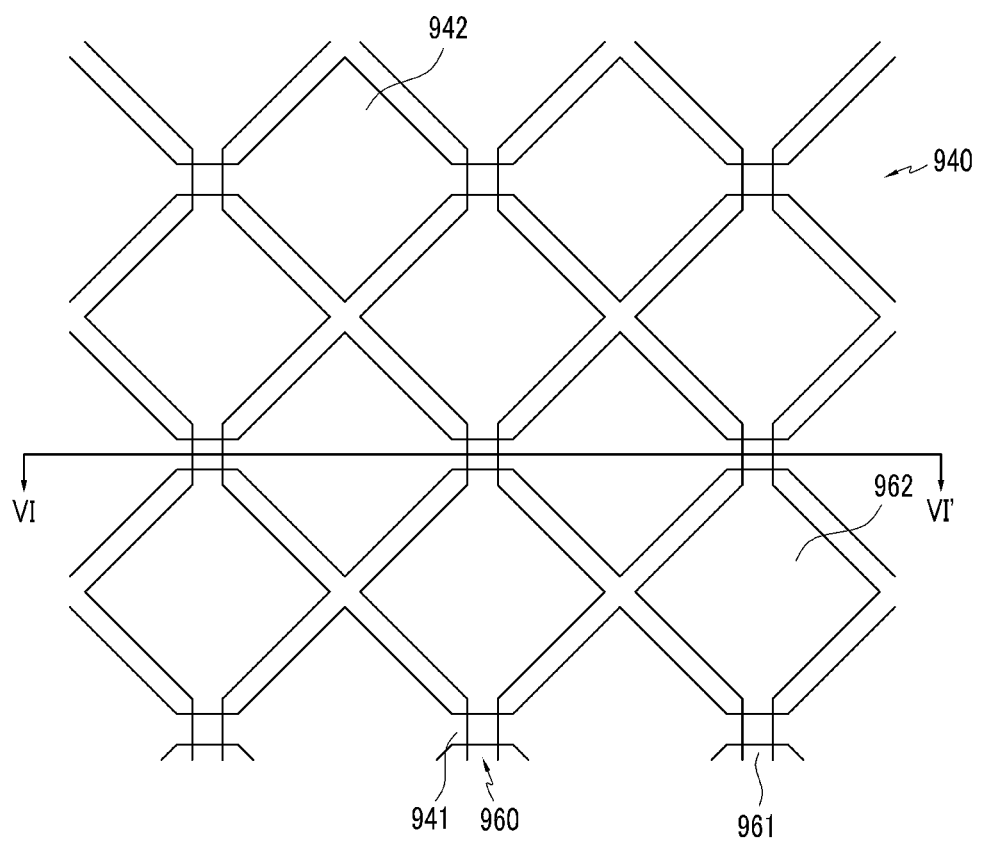
FIG. 5 is layout view of a touch screen panel in a display device according to an exemplary embodiment of the present invention.
Figure 6:
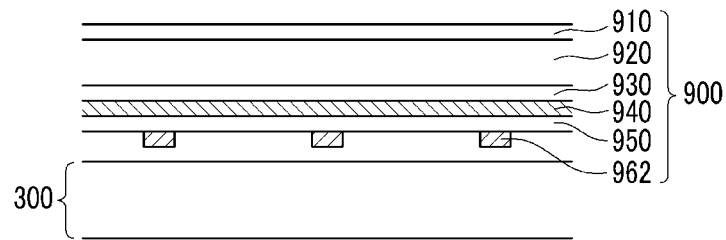
FIG. 6 is a cross-sectional view of a display device including the touch screen panel taken along line VI-VI' of FIG. 5.

FIG. 1 is a schematic diagram of a display device according to an exemplary embodiment of the present invention. FIG. 2 is a schematic diagram showing a display panel in a display device according to an exemplary embodiment of the present invention, FIG. 3 is a block diagram of a part of a display device according to an exemplary embodiment of the present invention, and FIG. 4 is an equivalent circuit diagram of a sensing unit in a display device according to an exemplary embodiment of the present invention. FIG. 5 is layout view of a touch screen panel in a display device according to an exemplary embodiment of the present invention, and FIG. 6 is a cross-sectional view of a display device including the touch screen panel taken along line VI-VI' of FIG. 5.

Referring to FIG. 1, the display device according to an exemplary embodiment of the present invention includes a display panel 300, a touch screen panel 900, and a control unit CU. The display panel 300 and the touch screen panel 900 are aligned with each other and are controlled by the control unit CU.

As shown in FIG. 2, the display panel 300 includes a plurality of pixels PX that are arranged in an approximate matrix form. Each pixel PX may display one primary color (spatial division) or may sequentially and alternately display the primary colors (temporal division), and allows a desired color to be recognized with a spatial or temporal combination of the primary colors. An example of a set of the primary colors includes red, green, and blue. In the spatial division, a dot, which is a basic unit of an image, is formed by a combination of three pixels PX that display red, green, and blue, respectively.

Referring to FIG. 3, the touch screen panel 900 includes a plurality of sensing signal lines $SY_1$-$SY_N$ and $SX_1$-$SX_M$ and a plurality of sensing units SU that are connected thereto and arranged in an approximate matrix form from an equivalent circuital view. The sensing signal lines $SY_1$-$SY_N$ and $SX_1$-$SX_M$ include a plurality of row sensor data lines $SY_1$-$SY_N$ and a plurality of column sensor data lines $SX_1$-$SX_M$ to transfer a sensing signal.

Referring to FIG. 4, each sensing unit SU may be disposed in a region that is defined by one row or column sensor data line SL1 and two adjacent row or column sensor data lines SL21 and SL22 and is connected to a sensor data line SL. The sensor data line SL1 and the sensor data lines SL21 and SL22 cross each other with an insulating layer 950 interposed therebetween. The sensing unit SU includes a variable capacitor Cv that is connected to the sensor data line SL1, and a reference capacitor Cp that is formed by the sensor data line SL1 and the sensor data lines SL21 and SL22.

The touch screen panel 900 includes an insulation substrate 920 and several thin film structures that are arranged on both surfaces thereof, as shown in FIG. 5 and FIG. 6.

An overcoat 910 is disposed on a surface of the insulation substrate 920 that faces away from the display panel 300, and row sensor data lines $SY_1$-$SY_N$ (denoted by reference numeral 940 in FIG. 5 and FIG. 6) and column sensor data lines $SX_1$-$SX_M$ (denoted by reference numeral 960 in FIG. 5 and FIG. 6) are disposed on a surface of the insulation substrate 920 that faces the display panel 300.

Each row sensor data line 940 includes a row sensor line 941 that extends in a horizontal direction, and a row sensor electrode 942 that extends from a part of the row sensor line 941 in a rhombus form. For convenience of description, a portion connecting the row sensor line 941 to the row sensor electrode 942 is referred to as a row connector. The column sensor data lines $SX_1$-$SX_M$ include a column sensor line 961 extending in a vertical direction and a column sensor electrode 962 that extends from a part of the column sensor line 961 in a rhombus form. For convenience of description, a portion connecting the column sensor line 961 to the column sensor electrode 962 is referred to as a column connector.

Because the row sensor electrode 942 and the column sensor electrode 962 are alternately disposed in a diagonal direction and are arranged close to each other, the row sensor electrode 942 and the column sensor electrode 962 occupy most of the area of the touch screen panel 900. The row connector and the column connector cross each other.

A passivation layer 930 is disposed between the insulation substrate 920 and the row sensor data lines 940, and an insulating layer 950 is disposed between the row sensor data lines 940 and the column sensor data lines 960.

The sensor electrodes 942 and 962 form one electrode of the variable capacitor Cv, and a user's finger, etc. (hereinafter, referred to as a "touch object") forms the other electrode of the variable capacitor Cv. When a touch does not occur, it is as if a touch object exists at an infinite distance, and thus the capacitance of the variable capacitor Cv is 0. However, when a touch object touches a surface of the overcoat 910, because a distance between the sensor electrodes 942 and 962 and the touch object becomes a finite value, the capacitance becomes a non-zero value. In this case, the substrate 920 and the overcoat 910 between the touch object and the sensor electrodes 942 and 962 function as a dielectric material.

As described above, because the row sensor electrode 942 and the column sensor electrode 962 are alternately disposed, one sensor electrode 942/962 is disposed adjacent to four different sensor electrodes 962/942. That is, one row sensor electrode 942 is disposed adjacent to four column sensor electrodes 962, and one column sensor electrode 962 is disposed adjacent to four row sensor electrodes 942. The adjacent sensor electrodes 942 and 962 together with an insulating layer 950 that is interposed therebetween constitute a capacitor, and an adjacent reference capacitor Cp is connected to one sensor electrode 942/962.

The density of the row sensor electrode 942 or the column sensor electrode 962, i.e., the density of the sensing unit SU, is equal to or lower than the dot density of the display panel 300. For example, the density of the row sensor electrode 942 or the column sensor electrode 962 may be about ¼ of the dot density.

A specific voltage is alternately applied to the row sensor electrode 942 and the column sensor electrode 962. When the specific voltage is applied to the row sensor electrode 942, the column sensor electrode 962 is floated, and when the specific voltage is applied to the column sensor electrode 962, the row sensor electrode 942 is floated. When the sensor electrodes 942 and 962 are floated, if the capacitance of the variable capacitor Cv changes due to a touch, a magnitude of a junction point voltage Vn between the reference capacitor Cp and the variable capacitor Cv depends on a magnitude of the change in capacitance. A current according to the changed junction point voltage Vn is a sensing signal that flows through the applicable row or column sensor data line, and the occurrence of a touch may be determined based on the current.

If the size of the sensor electrodes 942 and 962 is small, the change of the junction point voltage Vn that is generated according to a touch may be sensed more easily than in a case in which an electrode is separately manufactured for the reference capacitor Cp.

Referring to FIG. 1 and FIG. 3, the control unit CU includes a sensing signal processor 800, a touch determiner 700, and a signal controller 600.

The sensing signal processor 800 includes a plurality of output units 810 that are respectively connected to the row sensor data lines $SY_1$-$SY_N$ of the touch screen panel 900, and a plurality of output units 820 that are respectively connected to the column sensor data lines $SX_1$-$SX_M$. The output units 810 and 820 generate an output voltage according to a sensing signal from the row and column sensor data lines $SY_1$-$SY_N$ and $SX_1$-$SX_M$. The sensing signal processor 800 converts the output voltage to a digital signal and processes the digital signal, thereby generating a digital sensing data signal DSN.

The touch determiner 700 determines the occurrence of a touch and a touch position by performing specific operation processing using the digital sensing data signal DSN from the sensing signal processor 800, and sends touch information.

The signal controller 600 controls an operation of the sensing signal processor 800.

Each driving unit 600, 700, and 800 may be directly mounted on the display panel 300 and/or the touch screen panel 900 in the form of at least one IC chip, may be mounted on a flexible printed circuit film (not shown) and attached to the display panel 300 and/or the touch screen panel 900 in the form of a tape carrier package (TCP), or may be mounted on a separate printed circuit board (PCB) (not shown). Alternatively, the driving units 600, 700, and 800 may be integrated in the display panel 300.

Next, an output unit of a sensing signal processor and a sensing operation of a display device including the output unit will be described in detail with reference to FIG. 7, FIG. 8, FIG. 9, and FIG. 10.

Figure 7:
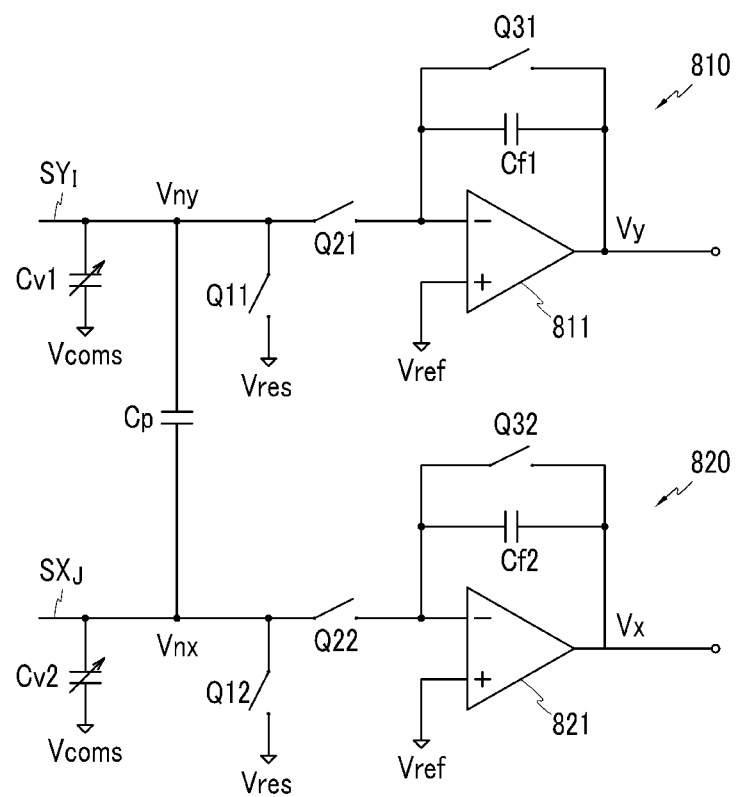
FIG. 7 is an equivalent circuit diagram of two output units of a sensing signal processor in a display device according to an exemplary embodiment of the present invention.
Figure 8:
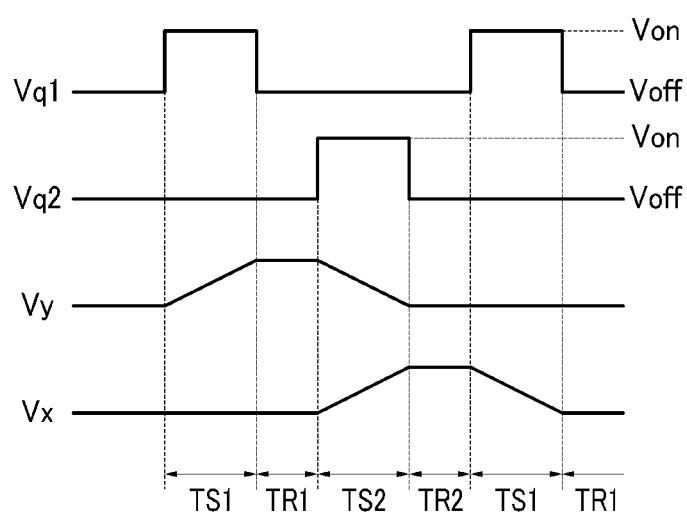
FIG. 8 is a signal waveform diagram of a sensing signal processor according to an exemplary embodiment of the present invention.
Figure 9:
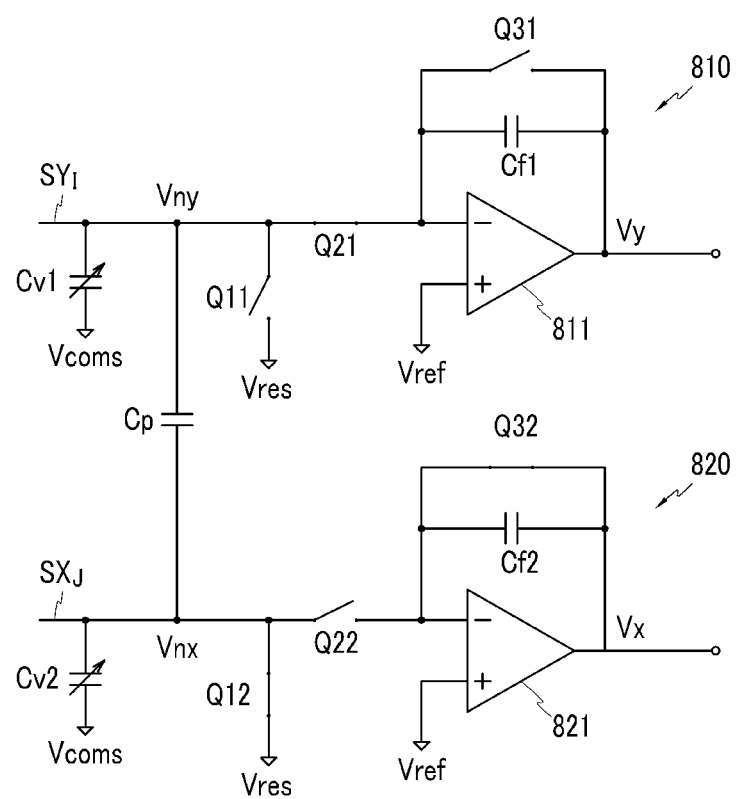
FIG. 9 and FIG. 10 are diagrams showing operations of the two output units that are shown in FIG. 7.
Figure 10:
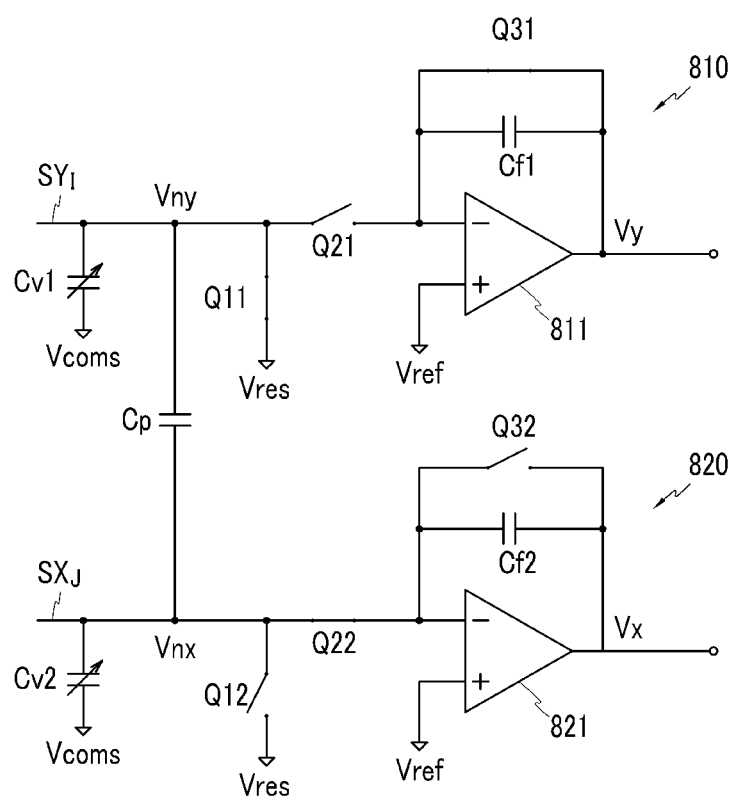

FIG. 7 is an equivalent circuit diagram of two output units of a sensing signal processor in a display device according to an exemplary embodiment of the present invention, FIG. 8 is a signal waveform diagram of a sensing signal processor according to an exemplary embodiment of the present invention, and FIG. 9 and FIG. 10 are diagrams showing operations of the two output units shown in FIG. 7.

Referring to FIG. 7, an output unit 810, for example an output unit 810 connected to an $I^{th}$ row sensor data line $SY_I$, includes an amplifier 811, two reset switching elements Q11 and Q31, a sensor switching element Q21, and a capacitor Cf1.

Likewise, an output unit 820, for example an output unit 820 connected to a $J^{th}$ column sensor data line $SX_J$, includes an amplifier 821, two reset switching elements Q12 and Q32, a sensor switching element Q22, and a capacitor Cf2.

Each amplifier 811/821 has an inversion terminal (−), a non-inversion terminal (+), and an output terminal. The inversion terminal (−) is connected to the sensor data line $SY_I/SX_J$, and the non-inversion terminal (+) is connected to a reference voltage Vref.

The capacitor Cf1/Cf2 is connected between the inversion terminal (−) and the output terminal of the amplifier 811/821.

As described above, a variable capacitor Cv1/Cv2 is formed by the sensor data line $SY_I/SX_J$ and a touch object, and a reference capacitor Cp is formed by the row sensor data line $SY_I$ and the column sensor data line $SX_J$.

The amplifier 811/821 and the capacitor Cf1/Cf2 are current integrators, and they generate an output voltage Vy/Vx by integrating a current flowing from the inversion terminal (−) of the amplifier 811/821 to the sensor data line $SY_I/SX_J$, i.e. a junction point between the variable capacitor Cv1/Cv2 and the reference capacitor Cp, during a specific time period, and send the output voltage Vy/Vx to the output terminal.

The sensor and reset switching elements Q11-Q31 and Q12-Q32 are three terminal elements, such as a transistor, having a control terminal, an input terminal, and an output terminal, and they are operated by a sensor control signal CONT from the signal controller 600. The sensor control signal CONT includes a row sensor control signal Vq1 to operate the sensor switching element Q21 of the output unit 810 and the reset switching elements Q12 and Q32 of the output unit 820, and a column sensor control signal Vq2 to operate the reset switching elements Q11 and Q31 of the output unit 810 and the sensor switching element Q22 of the output unit 820. The row sensor control signal Vq1 and the column sensor control signal Vq2 are formed by a combination of a gate-on voltage Von for turning on, and a gate-off voltage for turning off, the sensor and reset switching elements Q11-Q31 and Q12-Q32.

The reset switching element Q11/Q12 is connected between a reset voltage Vres and the sensor data line $SY_I/SX_J$, and initializes a voltage of the sensor data line $SY_I/SX_J$ to the reset voltage Vres when it is turned on. The reset voltage Vres is a voltage such as a ground voltage, and is lower than a reference voltage Vref.

The sensor switching element Q21/Q22 is connected between one end of the sensor data line $SY_I/SX_J$ and the inversion terminal (−) of the amplifier 811/821, and connects the sensor data line $SY_I/SX_J$ to the inversion terminal (−) of the amplifier 811/821 when it is turned on.

The reset switching element Q31/Q32 is connected in parallel to the capacitor Cf1/Cf2, (i.e. is connected between the inversion terminal (−) and the output terminal of the amplifier 811/821), discharges a voltage that is charged in the capacitor Cf1/Cf2, and initializes the output voltage Vy/Vx of the amplifier 811/821 to the reference voltage Vref when it is turned on.

Referring to FIG. 8 and FIG. 9, for a row sensing period TS1, the signal controller 600 outputs a row sensor control signal Vq1 of a gate-on voltage Von and a column sensor control signal Vq2 of a gate-off voltage Voff. Accordingly, the sensor switching element Q21 of the output unit 810 and the reset switching elements Q12 and Q32 of the output unit 820 are turned on. Accordingly, a voltage of the row sensor data line $SY_I$ and an output voltage Vy become a reference voltage Vref, and a voltage of the column sensor data line $SX_J$ is initialized to a reset voltage Vres. Therefore, in the variable capacitor Cv1 and the reference capacitor Cp, one terminal thereof is connected to the row sensor data line $SY_I$, and the other terminal thereof receives a voltage such as a ground voltage.

If a touch occurs in a region at which the row sensor data line $SY_I$ is positioned, capacitance of the variable capacitor Cv1 increases. Accordingly, because a junction point voltage Vny of the variable capacitor Cv1 and the reference capacitor Cp, i.e. a voltage of the row sensor data line $SY_I$, decreases, a current flows from the inversion terminal (−) of the amplifier 811 to the row sensor data line $SY_I$ through the switching element Q21. As the capacitor Cf1 is slowly charged by the current, the output voltage Vy of the amplifier 811 slowly increases. When a touch does not occur, an output voltage Vy of the amplifier 811 sustains a reference voltage Vref. Here, because the output voltage Vy is proportional to a length of the row sensing period TS1 and is inversely proportional to a magnitude of capacitance of the capacitor Cf1, by lengthening a row sensing period TS1 or by decreasing a magnitude of capacitance of the capacitor Cf1, a minute touch can be sensed.

By turning on the reset switching element Q32, a voltage that is stored in the capacitor Cf2 of the output unit 820 is discharged and an output voltage Vx of the amplifier 821 is initialized to a reference voltage Vref.

Thereafter, for a reading period TR1, as the row sensor control signal Vq1 becomes a gate-off voltage Voff, all switching elements Q11, Q21, and Q31 and Q12, Q22, and Q32 are turned off. Accordingly, the inversion terminals (−) of the amplifiers 811 and 821 are floated and thus the amplifiers 811 and 821 sustain output voltages Vy and Vx. After reading the output voltage Vy of the amplifier 811, the sensing signal processor 800 converts the output voltage Vy to the digital sensing data signal DSN and sends the digital sensing data signal DSN to the touch determiner 700.

Next, referring to FIG. 8 and FIG. 10, for a column sensing period TS2, the column sensor control signal Vq2 becomes a gate-on voltage Von. Accordingly, a sensor switching element Q22 of the output unit 820 and reset switching elements Q11 and Q31 of the output unit 810 are turned on. Accordingly, a voltage of the column sensor data line $SX_J$ and an output voltage Vx become a reference voltage Vref, and a voltage of the row sensor data line $SY_I$ is initialized to the reset voltage Vres. Therefore, in the variable capacitor Cv2 and the reference capacitor Cp, one terminal thereof is connected to the column sensor data line $SX_J$, and the other terminal thereof receives a voltage such as a ground voltage.

When a touch is generated in a region at which that the column sensor data line $SX_J$ is positioned, the capacitance of the variable capacitor Cv2 increases and a junction point voltage Vnx of the variable capacitor Cv2 and the reference capacitor Cp, i.e. a voltage of the column sensor data line $SX_J$, is lowered. Accordingly, a current flows from the inversion terminal (−) of the amplifier 821 to the column sensor data line $SX_J$ through the switching element Q22, and as the capacitor Cf2 is slowly charged by the current, an output voltage Vx of the amplifier 821 slowly increases. When a touch does not occur, the output voltage Vx of the amplifier 821 sustains a reference voltage Vref that is initialized in the row sensing period TS1.

By turning on the reset switching element Q31, a voltage that is stored in the capacitor Cf1 of the output unit 810 is discharged and an output voltage Vy is initialized to the reference voltage Vref.

Thereafter, for a reading period TR2, as the column sensor control signal Vq2 becomes a gate-off voltage Voff, all switching elements Q11, Q21, and Q31 and Q12, Q22, and Q32 are turned off. Accordingly, the amplifiers 811 and 821 sustain the output voltages Vy and Vx, and the sensing signal processor 800 converts the output voltage Vx of the amplifier 821 to the digital sensing data signal DSN and sends the digital sensing data signal DSN to the touch determiner 700.

The touch determiner 700 determines whether a touch occurs in row and column sensor data lines $SY_1$-$SY_N$ and $SX_1$-$SX_m$ based on the digital sensing data signal DSN of all row and column sensor data lines $SY_1$-$SY_N$ and $SX_1$-$SX_M$. In this case, if a touch occurs in the row sensor data line $SY_I$ and the column sensor data line $SX_J$, the touch determiner 700 determines a coordinate (I, J) of the row sensor data line $SY_I$ and the column sensor data line $SX_J$ as a touch position and sends the touch information to an external device or the signal controller 600.

As described above, in an exemplary embodiment of the present invention, the output units 810 and 820 correspond one to one to the row and column sensor data lines $SY_I$-$SY_N$ and $SX_1$-$SX_M$. However, when the density of the sensing units SU increases in the touch screen panel 900, even if one touch occurs, several sensing units SU may recognize the touch. Accordingly, an accurate touch position may not be determined. Hereinafter, an exemplary embodiment of determining an accurate touch position will be described in detail with reference to FIG. 11, FIG. 12, FIG. 13, FIG. 14, FIG. 15, FIG. 16, FIG. 17, and FIG. 18 for the case in which several sensing units SU recognize a touch.

Figure 11:
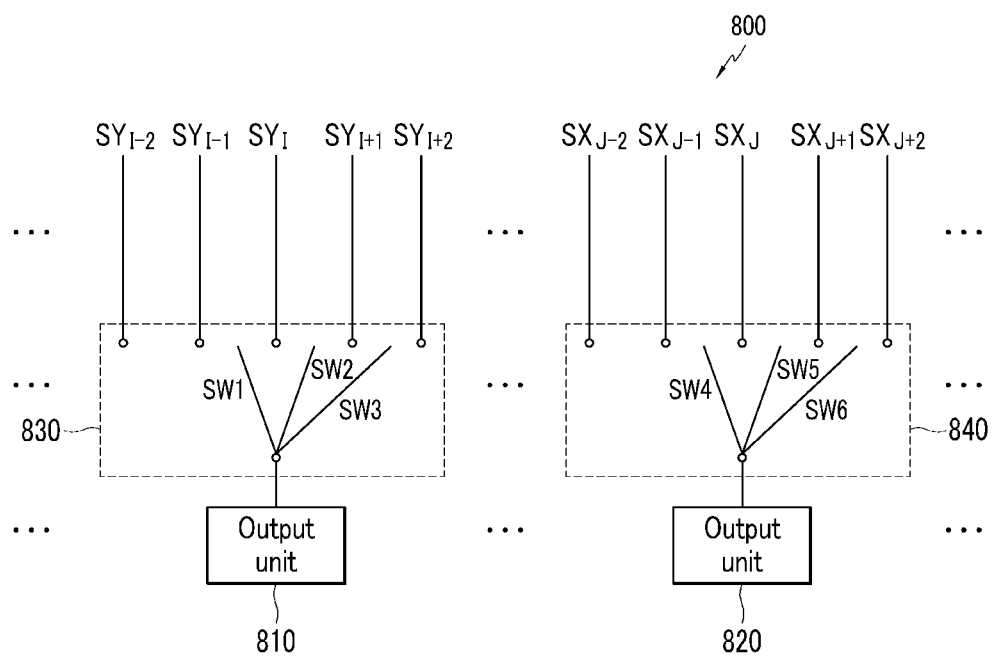
FIG. 11 is a block diagram of a sensing signal processor of a display device according to another exemplary embodiment of the present invention.
Figure 12:
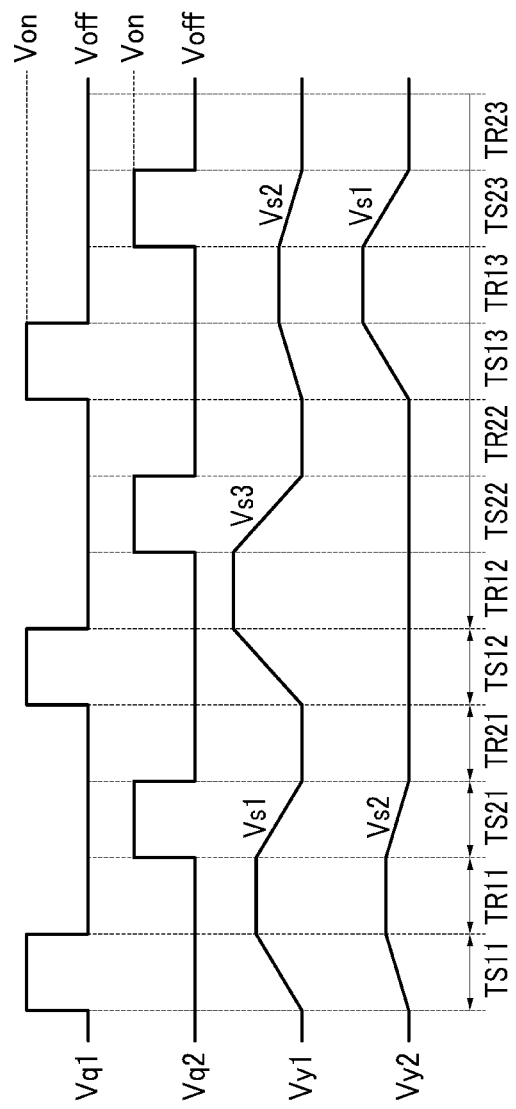
FIG. 12 is a signal waveform diagram of a sensing signal processor according to another exemplary embodiment of the present invention.

FIG. 11 is a block diagram of a sensing signal processor of a display device according to another exemplary embodiment of the present invention, FIG. 12 is a signal waveform diagram of a sensing signal processor according to another exemplary embodiment of the present invention, and FIG. 13, FIG. 14, FIG. 15, FIG. 16, FIG. 17, and FIG. 18 are diagrams showing operations of two output units of a sensing signal processor according to another exemplary embodiment of the present invention.

Referring to FIG. 11, the sensing signal processor 800 includes a plurality of output units 810 and 820, and a plurality of switching units 830 and 840 that are respectively connected to the plurality of output units 810 and 820.

Each output unit 810/820 is selectively connected to at least two row or column sensor data lines $SY_1$-$SY_N$/$SX_1$-$SX_M$, for example three row or column sensor data lines $SY_1$-$SY_N$/$SX_1$-$SX_m$, by an operation of the corresponding switching unit 830/840 to generate an output voltage according to a sensing signal therefrom.

Each switching unit 830, for example a switching unit 830 to select three row sensor data lines among an $(I-2)^{th}$ to an $(I+2)^{th}$ row sensor data lines $SY_{I-2}$-$SY_{I+2}$ and connecting the selected three row sensor data lines to the output unit 810, includes three switching elements SW1-SW3. One terminal of each of the three switching elements SW1, SW2, and SW3 is connected to the output unit 810, the other terminals thereof are respectively connected to three adjacent row sensor data lines among the row sensor data lines $SY_{I-2}$-$SY_{I+2}$, and a combination of three adjacent row sensor data lines sequentially changes. When the switching element SW1 is connected to an $(I-2)^{th}$ row sensor data line $SY_{I-2}$, two switching elements SW2 and SW3 are connected to an $(I-1)^{th}$ row sensor data line $SY_{I-1}$ and an $I^{th}$ row sensor data line $SY_I$, respectively. Next, when the switching element SW1 is connected to the $(I-1)^{th}$ row sensor data line $SY_{I-1}$, two switching elements SW2 and SW3 are connected to the $I^{th}$ row sensor data line $SY_I$ and the $(I+1)^{th}$ row sensor data line $SY_{I+1}$, respectively, and when the switching element SW1 is connected to the $I^{th}$ row sensor data line $SY_I$, two switching elements SW2 and SW3 are connected to the $(I+1)^{th}$ row sensor data line $SY_{I+1}$ and the $(I+2)^{th}$ row sensor data line $SY_{I+2}$, respectively.

Another switching unit 830 adjacent to the switching unit 830 selects three row sensor data lines among the $(I+1)^{th}$ row sensor data line $SY_{I+1}$ to an $(I+5)^{th}$ row sensor data line $SY_{I+5}$, and connects three row sensor data lines to the corresponding output unit 810.

Likewise, three switching elements SW4, SW5, and SW6 of the switching unit 840 to select three column sensor data lines among a $(J-2)^{th}$ column sensor data line $SX_{J-2}$ to a $(J+2)^{th}$ column sensor data line $SX_{J+2}$ and to connect the three column sensor data lines to the output unit 820 are connected to three adjacent sensor data lines among the column sensor data lines $SX_{J-2}$-$SX_{J+2}$, and a combination of three adjacent column sensor data lines sequentially changes. Further, another switching unit 840 adjacent to the switching unit 840 selects three column sensor data lines among a $(J+1)^{th}$ column sensor data line to a $(J+5)^{th}$ column sensor data line $SX_{J+1}$-$SX_{J+5}$, and connects three column sensor data lines to the corresponding output unit 820.

In this way, the sensing signal processor 800 generates digital sensing data signals DSN according to output voltages of the output units 810 and 820 while changing a combination of the sensor data lines $SY_1$-$SY_N$ and $SX_1$-$SX_M$ that are connected to the output units 810 and 820 through the switching units 830 and 840. The touch determiner 700 determines a combination of the sensor data lines $SY_1$-$SY_N$ and $SX_1$-$SX_M$ in which the highest output voltage is generated based on the digital sensing data signal DSN and generates touch information based on the combination.

This will be described in detail with reference to FIG. 12, FIG. 13, FIG. 14, FIG. 15, FIG. 16, FIG. 17, and FIG. 18.

In FIG. 12, FIG. 13, FIG. 14, FIG. 15, FIG. 16, FIG. 17, and FIG. 18, it is assumed that a touch occurs in a region in which three row sensor data lines $SY_I$-$SY_{I+2}$ are disposed, and switching units 830a and 830b, which are connected to these row sensor data lines $SY_I$-$SY_{I+2}$ among the plurality of switching units 830, and output units 810a and 810b, which are connected to the switching units 830a and 830b among a plurality of output units 810, are exemplified.

Figure 13:
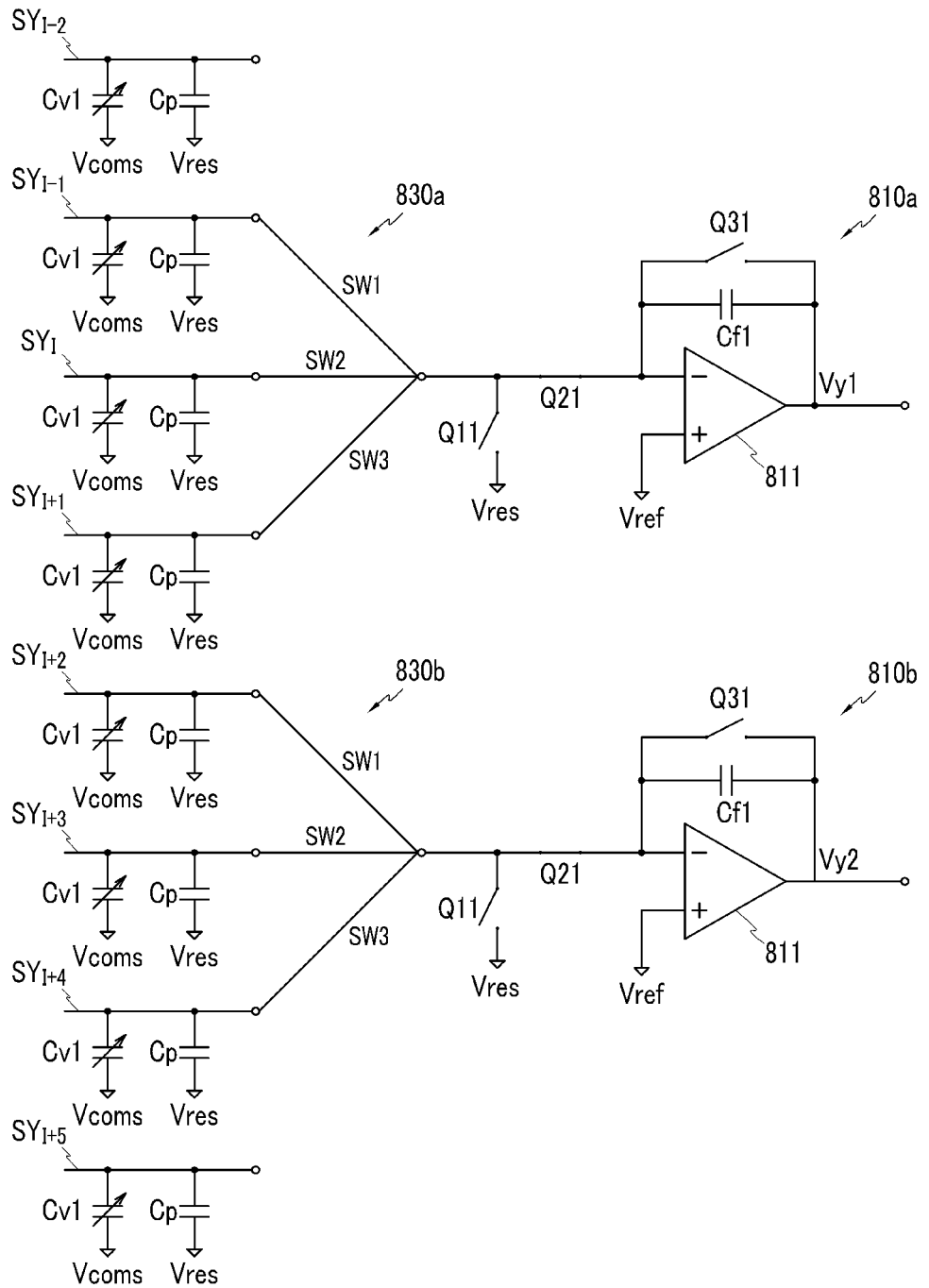
FIG. 13, FIG. 14, FIG. 15, FIG. 16, FIG. 17, and FIG. 18 are diagrams showing operations of two output units of a sensing signal processor according to another exemplary embodiment of the present invention.

Referring to FIG. 12 and FIG. 13, during a row sensing period TS11, the signal controller 600 outputs a row sensor control signal Vq1 of a gate-on voltage Von and a column sensor control signal Vq2 of a gate-off voltage Voff. Accordingly, a sensor switching element Q21 of the output units 810a and 810b is turned on and reset switching elements Q12 and Q32 of the output unit 820 (see FIG. 7) that are connected to the column sensor data lines $SX_1$-$SX_M$ are turned on, and thus a reset voltage Vres is applied to the other terminal of the reference capacitor Cp. Further, the switching elements SW1, SW2, and SW3 of the switching unit 830a are respectively connected to the row sensor data lines $SY_{I-1}$-$SY_{I+1}$ and the switching elements SW1, SW2, and SW3 of the switching unit 830b are respectively connected to the row sensor data lines $SY_{I+2}$-$SY_{I+4}$.

When a touch occurs in a region in which the row sensor data lines $SY_I$-$SY_{I+2}$ are disposed, the capacitance of the variable capacitor Cv1 that is connected to the row sensor data lines $SY_I$-$SY_{I+2}$ may increase and a junction point voltage Vny of the variable capacitor Cv1 and the reference capacitor Cp, i.e. a voltage of the row sensor data lines $SY_I$-$SY_{I+2}$, may decrease. Therefore, as a current flows from an inversion terminal (−) of the amplifier 811 of the output unit 810a to two row sensor data lines $SY_I$ and $SY_{I+1}$, an output voltage Vy1 of the amplifier 811 increases up to a voltage Vs1. Further, as a current flows from the inversion terminal (−) of the amplifier 811 of the output unit 810b to one row sensor data line $SY_{I+2}$, an output voltage Vy2 of the amplifier 811 increases up to a voltage Vs2 that is lower than the voltage Vs1.

Thereafter, during a reading period TR11, as the row sensor control signal Vq1 becomes a gate-off voltage Voff, all switching elements Q11, Q21, and Q31 and Q12, Q22, and Q32 are turned off. After reading the output voltages Vy1 and Vy2 of two output units 810a and 810b, the sensing signal processor 800 converts the output voltages Vy1 and Vy2 into a digital sensing data signal DSN and sends the digital sensing data signal DSN to the touch determiner 700.

Figure 14:
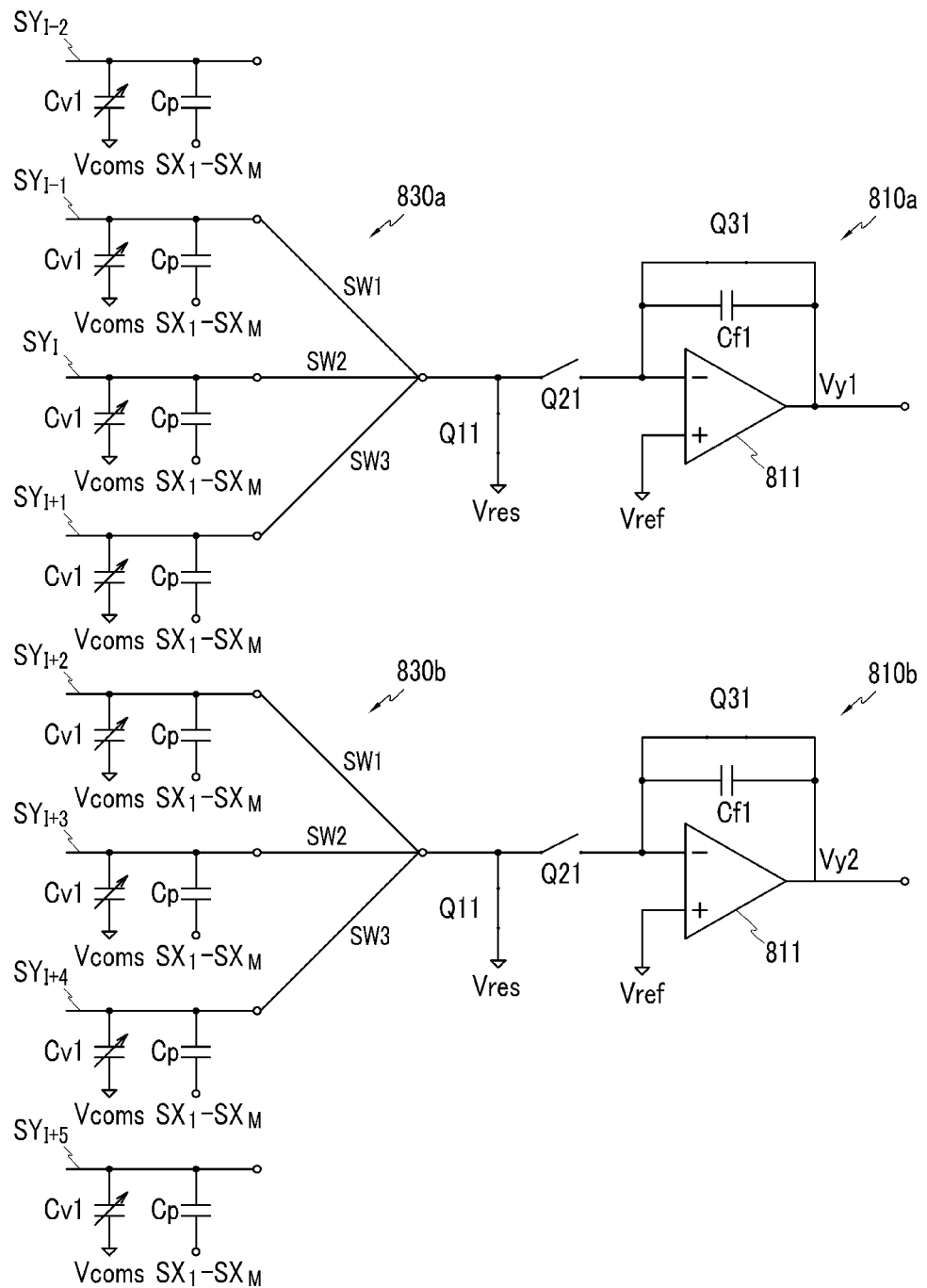

Next, referring to FIG. 12 and FIG. 14, a column sensor control signal Vq2 becomes a gate-on voltage Von during a column sensing period TS21. Accordingly, reset switching elements Q11 and Q31 of the output units 810a and 810b are turned on and thus a voltage of the row sensor data line $SY_{I-1}$-$SY_{I+4}$ is initialized to a reset voltage Vres and a voltage that is stored in the capacitor Cf1 is discharged. Further, although not shown, each output unit 820 is connected to the corresponding combination among the column sensor data lines $SX_1$-$SX_M$ by a switching unit 840, and the sensor switching element Q22 of each output unit 820 is turned on. Accordingly, each output unit 820 outputs an output voltage according to whether a touch is occurs in a region in which the connected column sensor data lines $SX_1$-$SX_M$ are disposed.

Thereafter, as the column sensor control signal Vq2 becomes a gate-off voltage Voff during a reading period TR21, the sensing signal processor 800 converts an output voltage of the output unit 820 into a digital sensing data signal DSN and sends the digital sensing data signal DSN to the touch determiner 700.

Figure 15:
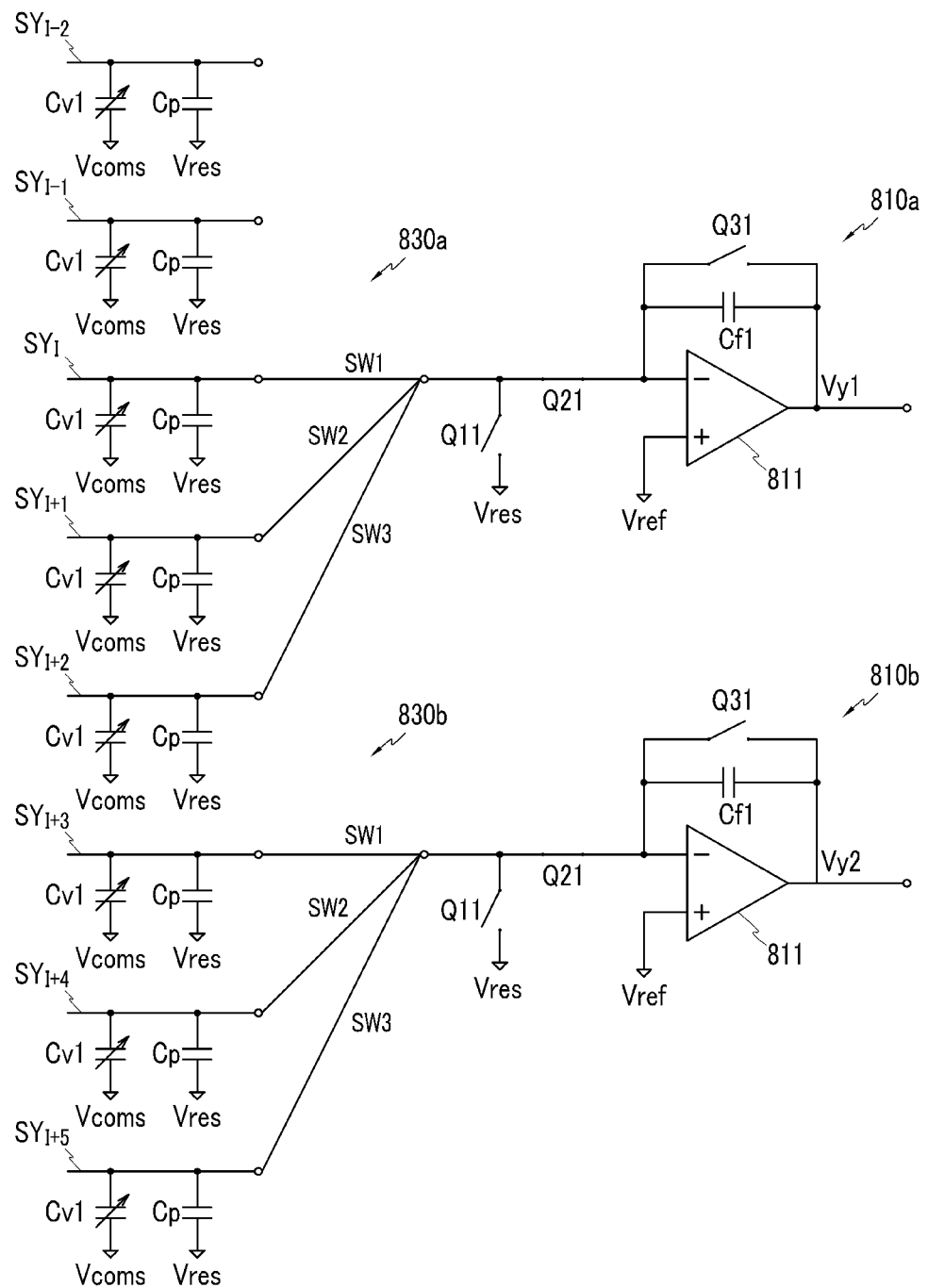

Referring to FIG. 12 and FIG. 15, during a row sensing period TS12, the row sensor control signal Vq1 again becomes a gate-on voltage Von, the switching elements SW1, SW2, and SW3 of the switching unit 830a are respectively connected to row sensor data lines $SY_I$-$SY_{I+2}$, and the switching elements SW1, SW2, and SW3 of the switching unit 830b are respectively connected to row sensor data line $SY_{I+3}$-$SY_{I+5}$.

In this case, as a current flows from an inversion terminal (−) of the amplifier 811 of the output unit 810a to three row sensor data lines $SY_I$-$SY_{I+2}$, an output voltage Vy1 of the amplifier 811 increases up to a voltage Vs3 that is higher than a voltage Vs1. Because the capacitance of a variable capacitor Cv1 that is connected to the row sensor data lines $SY_{I+3}$-$SY_{I+5}$ does not change, the amplifier 811 of the output unit 810b sustains an output voltage Vy2 as a reference voltage Vref.

Thereafter, during a reading period TR12, the row sensor control signal Vq1 again becomes a gate-off voltage Voff, and the sensing signal processor 800 converts output voltages Vy1 and Vy2 of two output units 810a and 810b into a digital sensing data signal DSN and sends the digital sensing data signal DSN to the touch determiner 700.

Figure 16:
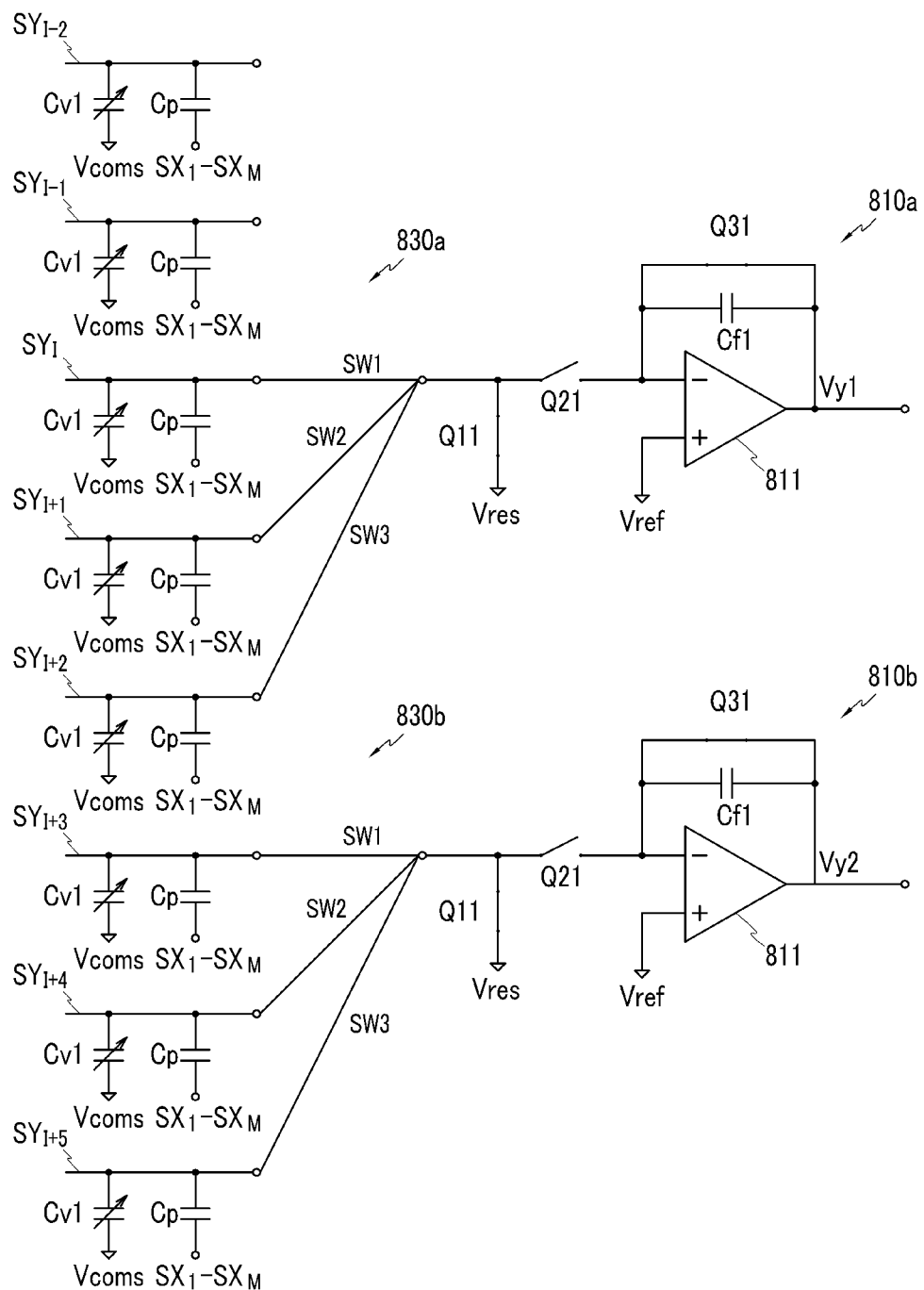

Referring to FIG. 12 and FIG. 16, during a column sensing period TS22, as the column sensor control signal Vq2 again becomes a gate-on voltage Von, a voltage of the row sensor data lines $SY_I$-$SY_{I+5}$ is initialized to a reset voltage Vres and a voltage that is stored in the capacitor Cf1 is discharged. Further, each output unit 820 is connected to the column sensor data lines $SX_1$-$SX_M$ with a combination different from that of the column sensing period TS21 by the switching unit 840, and the sensor switching element Q22 of each output unit 820 is turned on. Accordingly, each output unit 820 outputs an output voltage according to a touch that occurs in a region in which the connected column sensor data lines $SX_1$-$SX_M$ are disposed.

Thereafter, during a reading period TR22, as the column sensor control signal Vq2 again becomes a gate-off voltage Voff, the sensing signal processor 800 converts an output voltage of the output unit 820 to a digital sensing data signal DSN and sends the digital sensing data signal DSN to the touch determiner 700.

Figure 17:
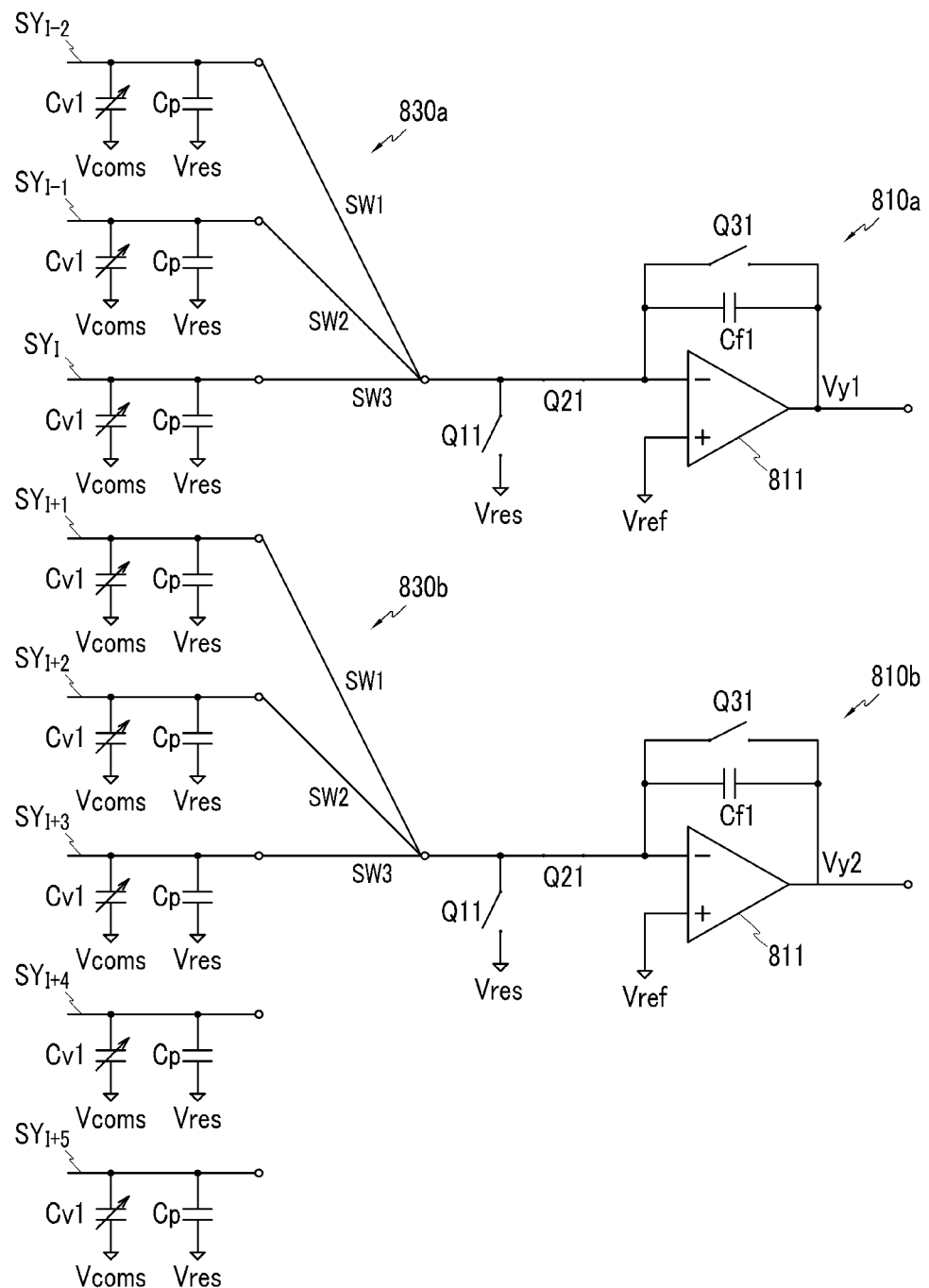

Referring to FIG. 12 and FIG. 17, during a row sensing period TS13, the row sensor control signal Vq1 again becomes a gate-on voltage Von, the switching elements SW1, SW2, and SW3 of the switching unit 830a are respectively connected to the row sensor data lines $SY_{I-2}$-$SY_I$, and the switching elements SW1, SW2, and SW3 of the switching unit 830b are respectively connected to the row sensor data lines $SY_{I+1}$-$SY_{I+3}$.

Accordingly, as a current flows from an inversion terminal (−) of the amplifier 811 of the output unit 810a to one row sensor data line $SY_I$, an output voltage Vy1 of the amplifier 811 increases up to a voltage Vs2. Further, as a current flows from the inversion terminal (−) of the amplifier 811 of the output unit 810b to two row sensor data lines $SY_{I+1}$, $SY_{I+2}$, an output voltage Vy1 of the amplifier 811 may increase up to a voltage Vs1.

Thereafter, during a reading period TR13, as the row sensor control signal Vq1 again becomes a gate-off voltage Voff, the sensing signal processor 800 converts output voltages Vy1 and Vy2 of two output units 810a and 810b into a digital sensing data signal DSN and sends the digital sensing data signal DSN to the touch determiner 700.

Figure 18:
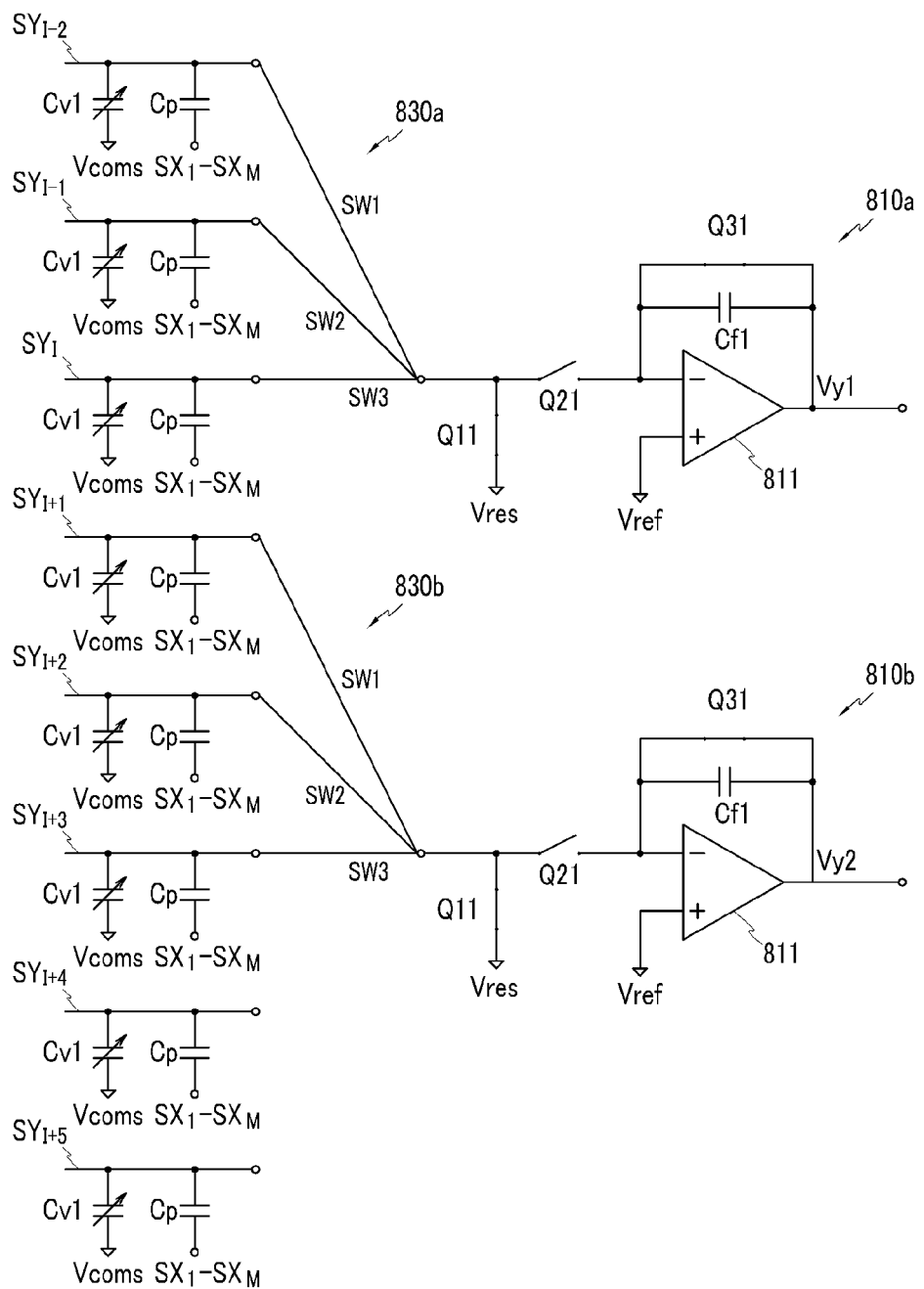

Referring to FIG. 12 and FIG. 18, during a column sensing period TS23, as the column sensor control signal Vq2 becomes a gate-on voltage Von, a voltage of the row sensor data lines $SY_{I-2}$-$SY_{I+3}$ is initialized to a reset voltage Vres and a voltage that is stored in the capacitor Cf1 is discharged. Further, each output unit 820 is connected to the column sensor data lines $SX_1$-$SX_M$ with a combination different from those of the column sensing periods TS21 and TS22 by the switching unit 840, and thus each output unit 820 outputs an output voltage Vx according to a touch that occurs in a region in which the column sensor data lines $SX_1$-$SX_M$ that are connected by the switching unit 840 are disposed.

Thereafter, during a reading period TR22, as the column sensor control signal Vq2 becomes a gate-off voltage Voff, the sensing signal processor 800 converts an output voltage Vx of the output unit 820 to the digital sensing data signal DSN and sends the digital sensing data signal DSN to the touch determiner 700.

Next, the touch determiner 700 determines a combination in which the highest output voltage is generated among three combinations using the digital sensing data signal DSN, and generates touch information. In the above-described case, because the output unit 810a generates a highest output voltage Vs3 in a row sensing period T12, the touch determiner 700 determines a middle row sensor data line $SY_I$ among three row sensor data lines $SY_I$-$SY_{I+2}$ that are connected to the output unit 810a in the row sensing period T12 as a touch position of a row direction. Likewise, the touch determiner 700 determines a touch position of a column direction through a combination of column sensor data lines that are connected to the output unit 820 generating the highest output voltage.

Through such a series of process, the touch determiner 700 determines the occurrence of a touch and a touch position, and the control unit CU performs processes of changing an image of the display panel 300 based on the information.

As an example of the display device, a liquid crystal display is described in detail with reference to FIG. 19 and FIG. 20.

Figure 19:
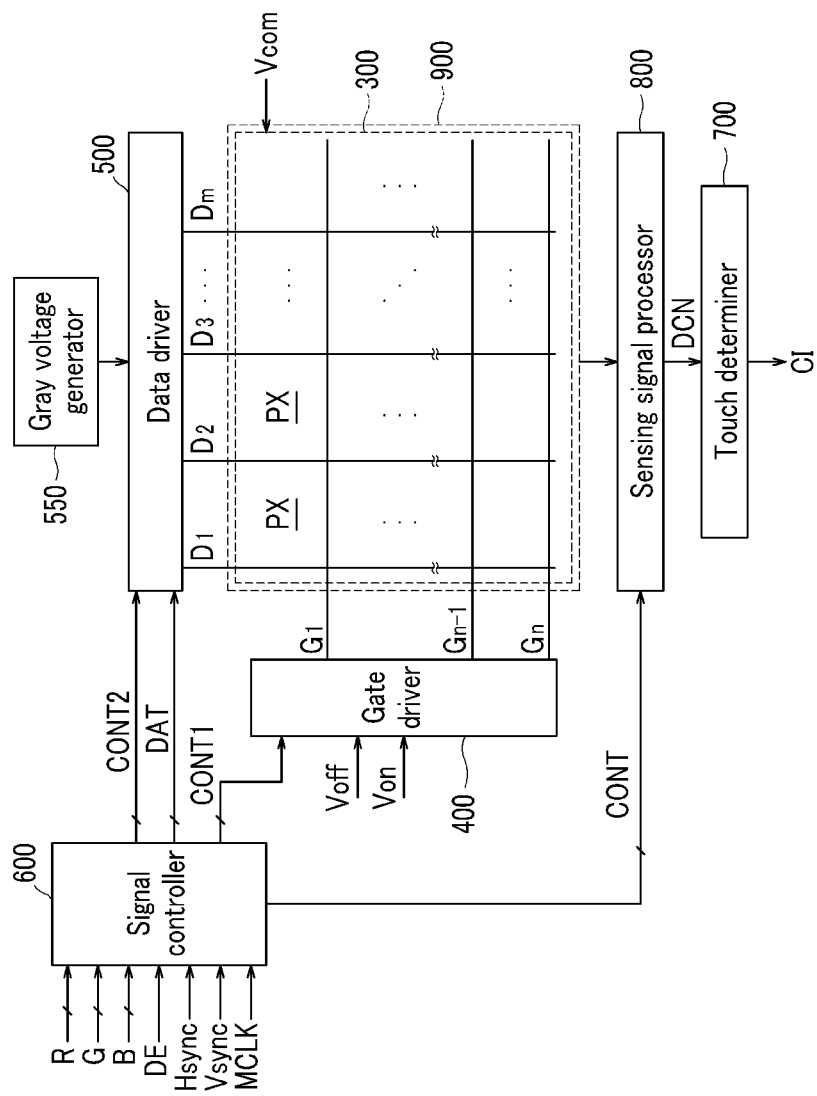
FIG. 19 is a block diagram of a liquid crystal display according to an exemplary embodiment of the present invention.
Figure 20:
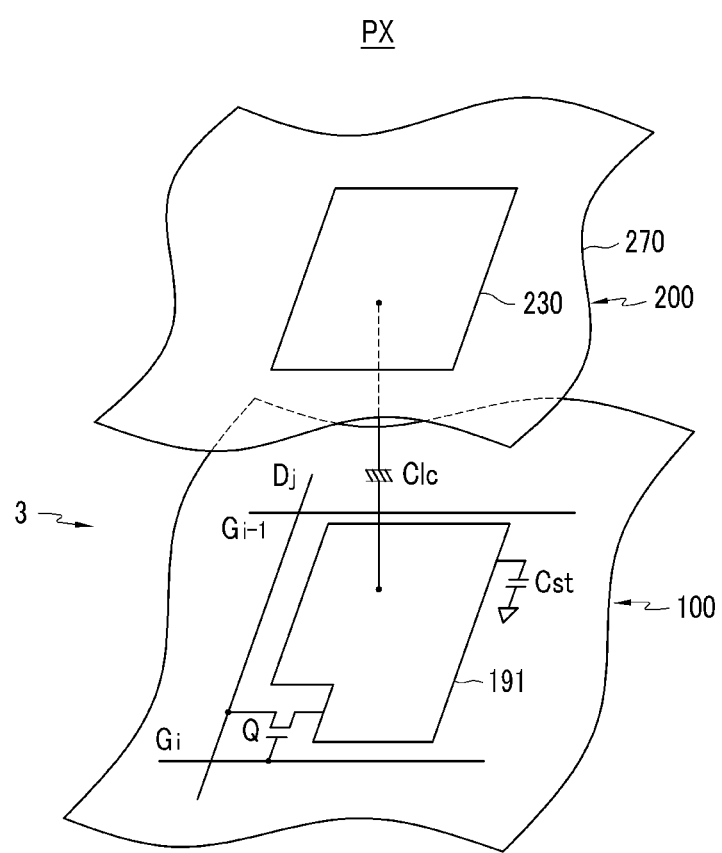
FIG. 20 is an equivalent circuit diagram of one pixel in a liquid crystal display according to an exemplary embodiment of the present invention.

FIG. 19 is a block diagram of a liquid crystal display according to an exemplary embodiment of the present invention, and FIG. 20 is an equivalent circuit diagram of one pixel in a liquid crystal display according to an exemplary embodiment of the present invention.

Referring to FIG. 19 and FIG. 20, a liquid crystal display according to an exemplary embodiment of the present invention includes a display panel 300, a touch screen panel 900, a gate driver 400, a data driver 500, a gray voltage generator 550, a signal controller 600, a touch determiner 700, and a sensing signal processor 800.

As shown in FIG. 19, the display panel 300 includes a plurality of display signal lines $G_1$-$G_n$ and $D_1$-$D_m$ and a plurality of pixels PX that are connected thereto and arranged in an approximate matrix form from an equivalent circuital view. The display panel 300 includes a lower panel 100 and an upper panel 200 that are opposite to each other, and a liquid crystal layer 3 that is interposed therebetween, referring to a structure that is shown in FIG. 20.

The display signal lines $G_1$-$G_n$ and $D_1$-$D_m$ include a plurality of gate lines $G_1$-$G_n$ to transfer a gate signal (scanning signal) and a plurality of data lines $D_1$-$D_m$ to transfer a data signal, i.e., a data voltage.

The gate lines $G_1$-$G_n$ extend in a row direction and are parallel to each other, and the data lines $D_1$-$D_m$ extend in a column direction and are parallel to each other.

Referring to FIG. 20, each pixel PX, for example a pixel PX that is connected to an $i^{th}$ (i=1, 2, ..., n) gate line $G_i$ and a $j^{th}$ (j=1, 2, ..., m) data line $D_j$, includes a switching element Q that is connected to a display signal line $G_i$ and $D_j$, and a liquid crystal capacitor Clc and a storage capacitor Cst that are connected thereto. The storage capacitor Cst may be omitted.

The switching element Q is a three terminal element such as a thin film transistor that is provided in the lower panel 100, and a control terminal thereof is connected to a gate line $G_i$, an input terminal thereof is connected to a data line $D_j$, and an output terminal thereof is connected to the liquid crystal capacitor Clc and the storage capacitor Cst.

The liquid crystal capacitor Clc uses a pixel electrode 191 of the lower panel 100 and a common electrode 270 of the upper panel 200 as two terminals, and a liquid crystal layer 3 between the two electrodes 191 and 270 functions as a dielectric material. The pixel electrode 191 is connected to the switching element Q, and the common electrode 270 is disposed on an entire surface of the upper panel 200 and receives a common voltage Vcom. Unlike the case of FIG. 20, the common electrode 270 may be provided in the lower panel 100, and in this case, at least one of two electrodes 191 and 270 may have a line shape or a bar shape.

The storage capacitor Cst as an assistant of the liquid crystal capacitor Clc is formed by the overlap of a separate signal line (not shown) and the pixel electrode 191 that are provided in the lower panel 100 with an insulator disposed therebetween, and a specific voltage such as a common voltage Vcom is applied to the separate signal line. However, the storage capacitor Cst may be formed by the overlap of the pixel electrode 191 and a previous gate line $G_{i-1}$ with an insulator disposed therebetween.

In order to represent color display, by allowing each pixel PX to inherently display one primary color (spatial division) or to sequentially alternately display the primary colors (temporal division), a desired color is recognized with a spatial or temporal combination of the primary colors. An example of a set of the primary colors includes red, green, and blue. FIG. 20 shows an example of spatial division in which each pixel PX is provided with a color filter 230 to display one of the primary colors in a region of the upper panel 200 corresponding to the pixel electrode 191. Unlike the case of FIG. 20, the color filter 230 may be provided on or under the pixel electrode 191 of the lower panel 100.

At least one polarizer (not shown) is provided in the display panel 300.

Referring again to FIG. 19, the gray voltage generator 550 generates two sets of gray voltages (or reference gray voltage sets) related to transmittance of the pixel PX. One of the two sets has a positive value for a common voltage Vcom and the other set has a negative value.

The gate driver 400 is connected to gate lines $G_1$-$G_n$ of the display panel 300 to apply a gate signal that is formed by a combination of a switch-on voltage to turn on and a switch-off voltage to turn off the switching element Q to the gate lines $G_1$-$G_n$. Each of the switch-on voltage and the switch-off voltage may be identical to the gate-on voltage Von and the gate-off voltage Voff that are shown in FIG. 8, particularly when the sensor and reset switching elements Q11-Q31 and Q12-Q32 that are shown in FIG. 7 are disposed in a transistor of the same type channel as that of the switching element Q.

The data driver 500 is connected to the data lines $D_1$-$D_m$ of the display panel 300, selects a gray voltage from the gray voltage generator 550, and applies the gray voltage as a data signal to the data lines $D_1$-$D_m$. However, when the gray voltage generator 550 does not provide a voltage for all grays but provides only the specific number of reference gray voltages, the data driver 500 divides the reference gray voltages, generates gray voltages for all grays, and selects a data signal from them.

The structure and function of the sensing signal processor 800 and the touch determiner 700 are substantially identical to those that are shown in FIG. 3, and thus detailed description thereof is omitted.

The signal controller 600 controls an operation of the gate driver 400, the data driver 500, the gray voltage generator 550, and the sensing signal processor 800.

Each driving unit 400, 500, 550, 600, 700, and 800 may be directly mounted on the display panel 300 and/or the touch screen panel 900 in a form of at least one IC chip, mounted on a flexible printed circuit film (not shown) to attach to the display panel 300 and/or the touch screen panel 900 in a form of a tape carrier package (TCP), or mounted on a separate printed circuit board (PCB) (not shown). Alternatively, the driving units 400, 500, 550, 600, 700, and 800 together with the display signal lines $G_1$-$G_n$ and $D_1$-$D_m$ and the switching element Q may be integrated with the display panel 300.

Now, an operation of the liquid crystal display will be described in detail.

The touch determiner 700 outputs touch information CI that notifies the existence of a touch and a touch position thereof to an external control unit (not shown), and the external control unit determines an image to be displayed by the display panel 300 based on the touch information CI. The external control unit generates input image signals R, G, and B that display the determined image and an input control signal that controls the display, and supplies them to the signal controller 600. The input image signals R, G, and B include luminance information of each pixel PX, and luminance has grays of a specific number, for example, 1024 (=$2^{10}$), 256 (=$2^8$), or 64 (=$2^6$). The input control signal includes, for example, a vertical synchronization signal Vsync, a horizontal synchronization signal Hsync, a main clock signal MCLK, and a data enable signal DE.

The signal controller 600 properly processes the input image signals R, G, and B based on the input image signals R, G, and B and the input control signal to correspond to an operating condition of the display panel 300, generates a gate control signal CONT1 and a data control signal CONT2, then sends the gate control signal CONT1 to the gate driver 400, and sends the data control signal CONT2 and the processed image signal DAT to the data driver 500.

The gate control signal CONT1 includes a scanning start signal STV that instructs the start of scanning and at least one clock signal that controls an output period of the gate-on voltage. The gate control signal CONT1 may further include an output enable signal that limits a sustain time of the gate-on voltage.

The data control signal CONT2 includes a horizontal synchronization start signal that notifies the start of transferring a digital image signal DAT for one row of pixels PX, and a load signal and a data clock signal that apply an analog data voltage to the data lines ($D_1$-$D_m$). The data control signal CONT2 may further include an inversion signal to invert polarity of a data voltage to a common voltage Vcom (hereinafter, "polarity of a data voltage to a common voltage" is referred to as "polarity of a data voltage").

The data driver 500 receives the digital image signal DAT for one row of pixels PX according to the data control signal CONT2 from the signal controller 600, converts the digital image signal DAT into an analog data voltage by selecting a gray voltage corresponding to each digital image signal DAT, and then applies the analog data voltage to the corresponding data lines ($D_1$-$D_m$).

The gate driver 400 applies a gate-on voltage to the gate lines $G_1$-$G_n$ according to the gate control signal CONT1 from the signal controller 600 to turn on a switching element Q that is connected to the gate lines $G_1$-$G_n$. Accordingly, a data voltage that is applied to the data lines $D_1$-$D_m$ is applied to the corresponding pixel PX through the switching element Q that is turned on.

A difference between the data voltage that is applied to the pixel PX and a common voltage Vcom is represented as a charge voltage, i.e. a pixel voltage of the liquid crystal capacitor Clc. Liquid crystal molecules change their arrangement according to a magnitude of a pixel voltage, so that polarization of light passing through the liquid crystal layer 3 changes. The change in the polarization is represented with the change in transmittance of light by the polarizer, whereby the pixel PX displays luminance according to a gray level of the image signal DAT.

By repeating the process with a unit of one horizontal period (referred to as "1H", period that is the same as one period of a horizontal synchronizing signal Hsync and a data enable signal DE), a gate-on voltage Von is sequentially applied to all gate lines $G_1$-$G_n$ and a data voltage is applied to all pixels PX, so that an image of one frame is displayed.

A state of an inversion signal that is applied to the data driver 500 is controlled so that a next frame starts when one frame ends and the polarity of a data voltage that is applied to each pixel PX is opposite to the polarity in a previous frame ("frame inversion"). In this case, according to characteristics of the inversion signal even within one frame, the polarity of a data voltage flowing through one data line may be periodically changed (e.g. row inversion and dot inversion) or the polarities of the data voltages applied to one pixel row may also be different from each other (e.g. column inversion, dot inversion).

In FIG. 19 and FIG. 20, a liquid crystal display is described as an example of a display device, but the display device is not limited thereto, and a plasma display and an organic light emitting display can be used as a display device.

As described above, according to an exemplary embodiment of the present invention, by forming a reference capacitor that is connected in parallel to a variable capacitor without a separate electrode, a touch position can be determined and thus a thickness of the touch screen panel may be thin. Further, according to an exemplary embodiment of the present invention, even in a case where several sensing units recognize a single touch, an accurate touch position may be determined.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a first sensor data line extending in a row direction and configured to transmit a first sensing signal, according to a touch to a first output unit, via a first sensing switching element;
a second sensor data line extending in a column direction and configured to transmit a second sensing signal, according to a touch to a second output unit, via a second sensing switching element;
a first reset switching element connected between the first sensor data line and a reset voltage;
a second reset switching element connected between the second sensor data line and the reset voltage,
wherein the first sensing switching element and the second reset switching element are simultaneously turned on during a first period, and
wherein the second sensing switching element and the first reset switching element are simultaneously turned on during a second period,
wherein the first output unit comprises:
a first amplifier including a first inversion terminal and a first output terminal;
a first capacitor connected between the first inversion terminal and the first output terminal of the first amplifier; and
a third reset switching element connected in parallel to the first capacitor, and
wherein the second output unit comprises:
a second amplifier including a second inversion terminal and a second output terminal;
a second capacitor connected between the second inversion terminal and the second output terminal of the second amplifier; and
a fourth reset switching element connected in parallel to the second capacitor,
wherein the first sensor switching element and the third reset switching element are simultaneously turned off during a third period between the first period and the second period, and the first output voltage is processed during the third period, and
wherein the second sensor switching element and the fourth reset switching element are simultaneously turned off during a fourth period between the second period and the first period, and the second output voltage is processed during the fourth period.

2. The display device of claim 1, further comprising:
a reference capacitor disposed between the first sensor data line and the second sensor data line;
a first variable capacitor connected to a first terminal of the reference capacitor in series and having a variable capacitance according to the touch; and
a second variable capacitor connected to a second terminal of the reference capacitor in series and having a variable capacitance according to the touch.

3. The display device of claim 2, wherein,
the first output unit generates a first output voltage by integrating the first sensing signal during the first period, and
the second output unit generates a second output voltage by integrating the second sensing signal during the second period.

4. The display device of claim 3, wherein,
the third reset switching element is turned on during the second period to initialize the first output terminal to a reference voltage, and
the fourth reset switching element is turned on during the first period to initialize the second output terminal to the reference voltage.

5. The display device of claim 1, wherein,
the first output unit generates a first output voltage by integrating the first sensing signal during the first period, and
the second output unit generates a second output voltage by integrating the second sensing signal during the second period.

6. The display device of claim 1, wherein,
the third reset switching element is turned on during the second period to initialize the first output terminal to a reference voltage, and
the fourth reset switching element is turned on during the first period to initialize the second output terminal to the reference voltage.

* * * * *